United States Patent [19]

Shinoda et al.

[11] 4,177,454

[45] Dec. 4, 1979

[54] DIGITAL DISPLAY SYSTEM

[75] Inventors: Yoshio Shinoda, Okazaki; Akira Kuno, Nagoya; Toshinobu Kuroyama, Kasugai, all of Japan

[73] Assignees: Nippon Soken, Inc., Nishio; Toyota Jidosha Kogyo Kabushiki Kaisha, Toyota, both of Japan

[21] Appl. No.: 911,895

[22] Filed: Jun. 2, 1978

[30] Foreign Application Priority Data

Jun. 8, 1977 [JP] Japan ............................. 52-67670

[51] Int. Cl.$^2$ .................... G04C 13/02; G08B 5/00
[52] U.S. Cl. ........................... 340/309.4; 58/24 R; 58/50 R
[58] Field of Search .................. 340/309.4; 58/24 R, 58/50 R

[56] References Cited

U.S. PATENT DOCUMENTS 3,861,134  1/1975  Chacon ........................... 58/24 R

*Primary Examiner*—Harold I. Pitts
*Attorney, Agent, or Firm*—Cushman, Darby & Cushman

[57] ABSTRACT

A digital display system with a control unit and a plurality of display units each adapted to be driven by a signal from the control unit. The control unit includes an A.C. power supply for generating a fixed A.C. voltage, and the control unit produces a multi-parallel-bit digital signal indicative of time or the like, extracts a pulse signal at the fixed frequency from the A.C. voltage, modulates the pulse signal with respective bits of the digital signal to produce a time-division multiplex signal, supplies the A.C. voltage to the respective display units and feed the time-division multiplex signal. Each of the display units rectifies the supplied A.C. voltage to produce a power supply voltage for the display unit, produces from the supplied A.C. voltage to be used for display, further produces a display signal from the produced A.C. voltage and the time-division multiplex signal and feed the display signal to a display device to display time or the like. The time-division multiplex signal sent from the control unit includes a reference time signal of a fixed frequency necessary for the display units so that the display units do not need to include oscillators to produce the reference time signal.

2 Claims, 7 Drawing Figures

DIGITAL DISPLAY SYSTEM

BACKGROUND OF THE INVENTION

The present invention relates to a digital display system wherein a plurality of display units located remotely from a control unit can be driven by a signal from the control unit.

In conventionally known digital display systems such as a digital clock system control part and display part are integrated, therefore, when it is desired to arrange display unit at two or more locations the same number of control units are also required. Therefore, a large space is required and the cost becomes expensive. Furthermore, in the prior art system, when it is so made that the control unit is single and a plurality of display units are provided, a number of wire harnesses are required and the diameter of the wire harness increases. In addition, the possibility of a breakage of the wires or failure of contact increases.

SUMMARY OF THE INVENTION

The present invention intends to overcome the drawbacks described above and it is an object of the present invention to provide a digital display system which uses time-division multiplex communication system to transmit signals between a single control unit and a plurality of display units and transmits an A.C. voltage of a fixed frequency through a power line to simplify a circuit configuration of the control unit by the use of the single control unit and also simplify a wire harness by the use of the time-division multiplex communication system. Among others, through the use of the A.C. voltage, a reference time signal of fixed frequency and a power supply voltage necessary for each display unit are transmitted so that an oscillator is eliminated at each display unit, which is otherwise required for producing the reference time signal.

According to the present invention, the digital display system comprises a single transmitter control unit including an A.C. power supply for generating an A.C. voltage of a fixed frequency and a time-divisional multiplex signal conversion circuit for extracting from said A.C. voltage a pulse signal of said fixed frequency to produce a reference position signal indicative of the beginning of a cycle period based on said pulse signal and address a section of said cycle period and produce a time-division multiplex signal bearing a command pulse at a preselected address in accordance with a desired display signal, a single signal wire over which said time-division multiplex signal is transmitted, a pair of power lines over which said A.C. voltage is transmitted, and a plurality of display units each operable to extract the pulse signal of said fixed frequency from the A.C. voltage transmitted over said power lines and extract the command pulse in said time-division multiplex signal transmitted over siad signal line in response to said pulse signal to digital-display information associated with said display signal. Accordingly, only one signal line is required, in addition to the pair of power lines, to transmit the signal to control the plurality of display units by the command from the single transmitter control part. Thus, it becomes unnecessary to provide a control unit for each display unit. Furthermore, since a time-division multiplex communication system is used, the design of wiring and the wiring work for transmitting the signal to the respective display units are simplified. Among others, since the digital display system according to this invention uses the A.C. power supply which generates the A.C. voltage of the fixed frequency, the reference time signal used to extract the command pulse for display from the time-division multiplex signal can be transmitted, in addition to the power to drive the display units. Consequently, an oscillator for producing the reference time signal is not necessary at each display unit. As a result, the wiring of the whole system and the transmitter and the receiver can be simplified.

DESCRIPTION OF THE PREFERRED EMBODIMENTS

Figure 1:
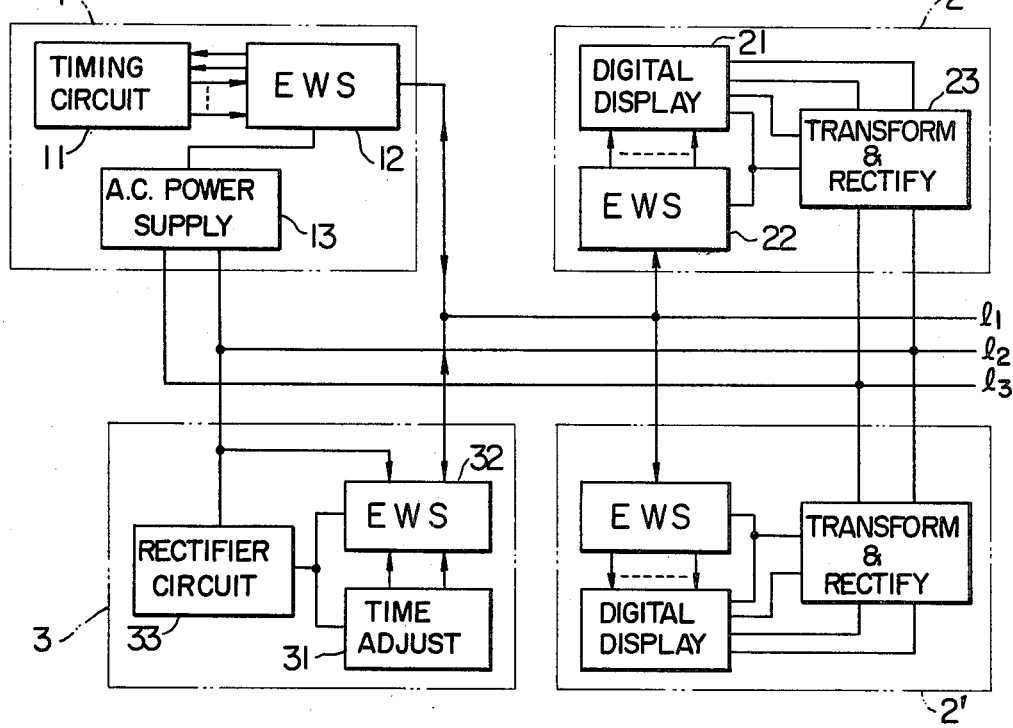
FIG. 1 is a block diagram of an overall configuration of a digital display system in accordance with the present invention.
Figure 6:
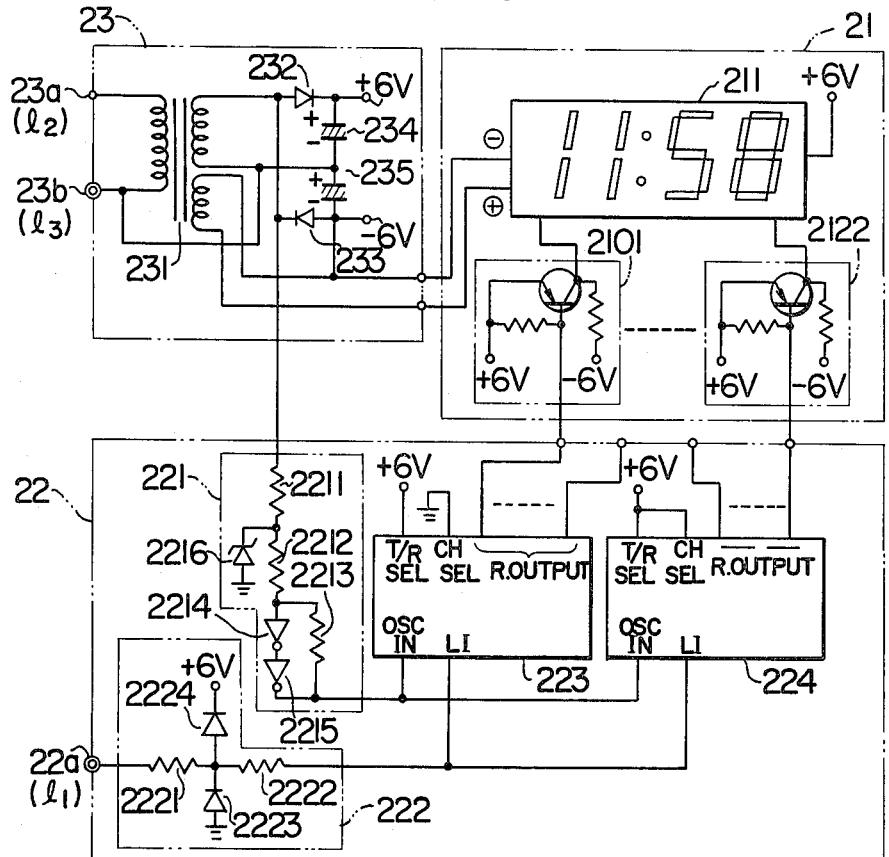

The present invention will now be explained in conjunction with an embodiment in which time is displayed at a plurality of locations. FIG. 1 shows an overall configuration of the embodiment, in which numeral 1 denotes a control unit which comprises a time signal circuit 11 for producing a multi-parallel-bit time signal for commanding a time to be displayed in digital form, an electrical wiring system (which is hereinafter abbreviated as E.W.S. and which uses, in the illustrated embodiment, a portion of the E.W.S. technology disclosed in the U.S. Pat. No. 3,944,981) 12 for converting the parallel time signal from the time signal circuit 11 to a serial time-division multiplex communication signal, and an A.C. power supply 13 for generating an A.C. voltage of a fixed frequency and a fixed amplitude. The A.C. power supply 13 is connected to the E.W.S. 12 to control the signal conversion at the E.W.S. 12 at the same frequency as that of the A.C. voltage. The E.W.S. 12 converts a serial time adjusting signal supplied from the outside of the control unit 1 to a parallel time adjusting signal and supplies it to the time signal circuit 11. Numerals 2 and 2' denote display units which are located remotely from the control unit 1 and remotely from each other, and which are of identical construction to each other. Therefore, only the display unit 2 will be explained in detail. The display unit 2 comprises a digital display circuit 21, an E.W.S. 22 for converting the serial time-division multiplex communication signal supplied from the control unit 1 to a static parallel time signal, and a transform and rectifying circuit 23 for supplying D.C. voltages and A.C. voltages necessary to the display circuit 21 and the E.W.S. 22. As will be described later in conjunction with FIG. 6, the digital display circuit 21 includes four fluorescent display tubes each capable of displaying digits 0 to 9 by selective firing of seven segments. When the time 58 minutes past 11 o'clock (11:58) is to be displayed as shown in FIG. 6, the digits "8", "5", "1" and "1" are displayed at first, second, third and fourth digit orders, respectively. In FIG. 1, numeral 3 denotes a time adjusting unit which comprises a time adjusting switching circuit 31 for producing two parallel signals for commanding the advance and the retard of time, an E.W.S. 32 for converting the parallel signals generated by the time adjusting swtiching circuit 31 to a serial time-division multiplex communication signal to transmit it to the control unit 1, and a rectifying circuit 33 for rectifying the A.C. voltage supplied from the A.C. power supply 13 of the control unit 1 into D.C. voltages necessary for the time adjusting swtiching circuit 31 and the E.W.S. 32. The connections between the control unit 1, the display units 2 and 2' and the time adjusting unit 3 are made by means of a total of three wire harnesses, i.e. a single signal line l₁ and two power lines l₂ and l₃.

Figure 2:
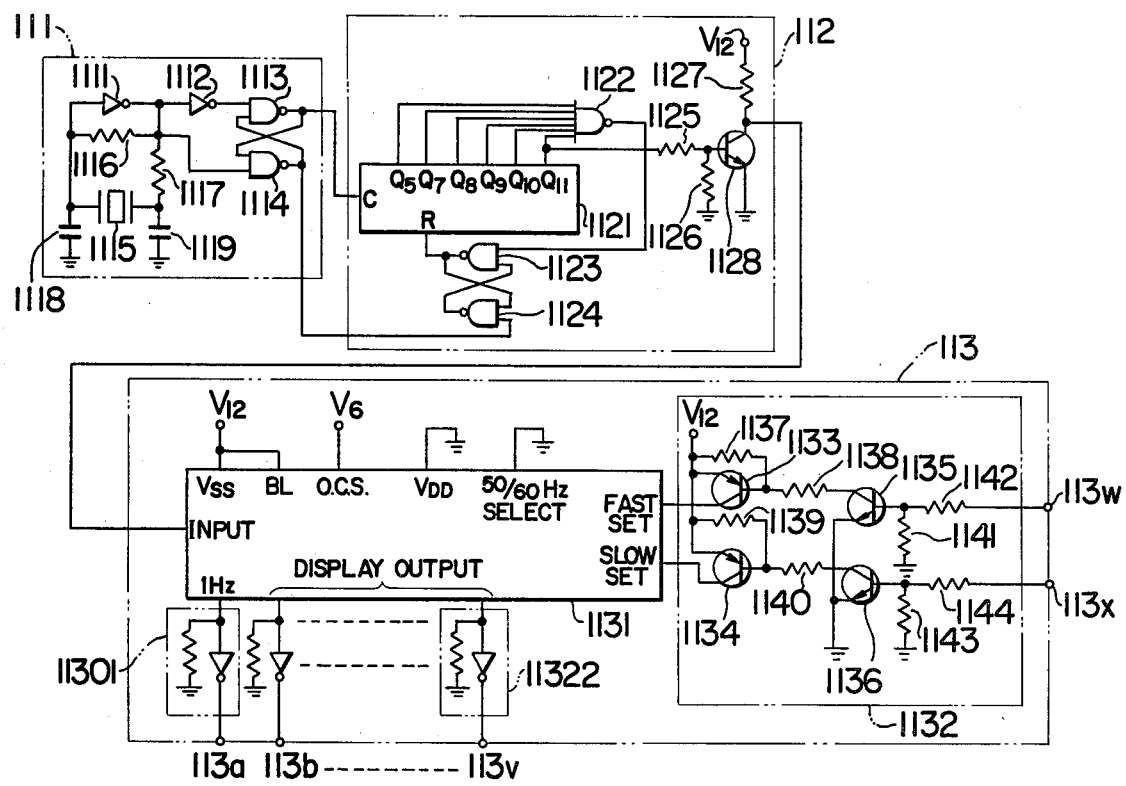
FIGS. 2 and 3 show electrical circuit diagrams illustrating embodiments of particular circuits of the system according to this invention.
Figure 3:
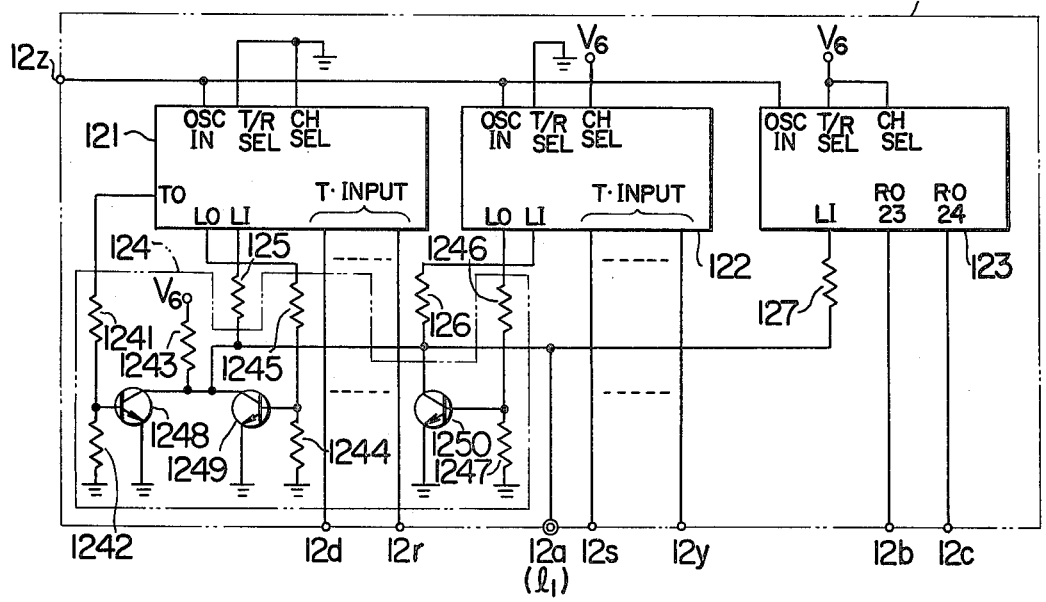
Figure 4:
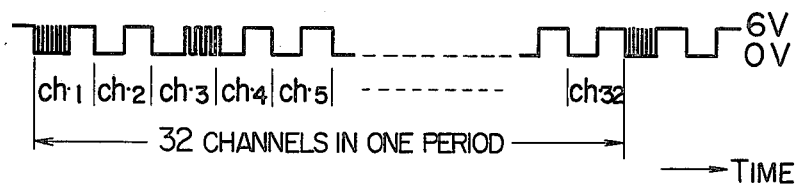
FIG. 4 shows voltage waveforms used to explain the operation of a single-line time-division multiplex communication system in the present digital display system.
Figure 5:
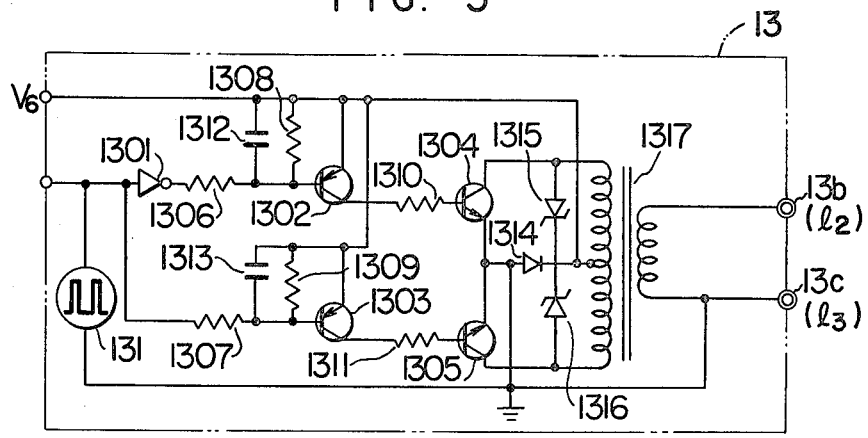
FIGS. 5, 6 and 7 show electrical circuit diagrams illustrating embodiments of other particular circuits of the system according to this invention.

Referring now to FIGS. 2 to 7, the detailed constructions and the operations of the respective circuits shown in FIG. 1 will be explained. In FIGS. 2 to 7, $V_{12}$ and $V_6$ show power supply terminals to which D.C. voltages of 12 volts and 6 volts, respectively, are applied, and the voltages $V_{12}$ and $V_6$ shown in FIGS. 2, 3 and 5 are supplied from a D.C. voltage supplies not shown. FIG. 2 shows an electrical circuit diagram illustrating the detail of the time signal circuit 11, in which numeral 111 denotes a known crystal oscillator circuit which comprises NOT gates 1111 and 1112, NAND gates 1113 and 1114, a crystal resonator 1115 having a natural oscillation frequency of 200 KHz, resistors 1116 and 1117 and capacitors 1118 and 1119. Numeral 112 denotes a frequency divider circuit for frequency-dividing a pulse signal of 200 KHz produced by the crystal oscillator circuit 111 to a signal of 50 Hz and comprises a 1/4000 frequency divider circuit including a binary counter (RCA CD4040) 1121, and NAND gate 1122, 1123 and 1124, and a voltage transform circuit including resistors 1125, 1126 and 1127 and an NPN transistor 1128. Numeral 113 denotes a time counting circuit for producing a time signal based on the frequency-divided signal supplied from the frequency divider circuit 112 and comprises a clock LSI (National Semiconductors Corporation MM5316) 1131, twenty-two output circuits 11301 to 11322 including NOT gates connected to display outputs of the LSI 1131 and resistors, and a voltage transform circuit connected to time adjusting terminals (FAST SET, SLOW SET) of the LSI for clock 1131 and including PNP transistors 1133, 1134, 1135 and 1136 and resistors 1137, 1138, 1139, 1140, 1141, 1142, 1143 and 1144. Numerals 113a to 113v denote 4-digit 7-segment output signal terminals for producing a 22-bit parallel time signal. Of the twenty-two bits of the 22-bit parallel time signal supplied from the LSI 1131 which is used for a clock seven bits, six bits, seven bits and one bit are used to specify the first, second, third and fourth order time indication digits, respectively, and one bit is used to command the flashing of a colon (:) between the o'clock digits and minute digits at the frequency of 1 Hz. Each bit of the parallel time signal becomes either "H" level or "L" level to indicate the time. Numerals 113w and 113x denote time adjusting signal input terminals of the LSI for clock 1131, which terminals are connected to the E.W.S. 12, which will be described in detail hereinlater.

FIG. 3 shows an electrical circuit diagram illustrating the detail of the E.W.S. 12, in which numerals 121, 122 and 123 denote LSI's (RCA SOS-LSI TA 6994) for carrying out parallel-to-serial conversion. Numeral 124 denotes a signal output circuit which comprises resistors 1241, 1242, 1243, 1244, 1245, 1246 and 1247 and NPN transistors 1248, 1249 and 1250 and produces the signals from the LSI's 121 and 122 as a serial time-division signal at a terminal 12a for transmission over the signal line l₁. Resistors 125, 126 and 127 serve as protecting resistors when the time-division signal transmitted to the E.W.S. 12 over the signal line l₁ is received by the LSI's 121, 122 and 123. Numerals 12b and 12c denote time adjusting signal output terminals for presenting the time adjusting signals in parallel to the input terminals 113w and 113x of the time signal circuit 11 when the LSI's 121 to 123 receive the serial time-division signal transmitted from the time adjusting unit 3 over the signal line l₁ and through the terminal 12a and extract the time adjusting signal therefrom. Numerals 12d to 12y denote twenty-two terminals which are connected to the twenty-two output terminals 113a to 113v of the time signal circuit 11 to present the 22-bit parallel time signal to the LSI's 121 and 122. Numeral 12z denotes a terminal to which a pulse signal of a frequency of 8 KHz is applied from the power supply circuit 13 to present the pulse signal to the LSI's 121, 122 and 123.

In the construction shown, the E.W.S. 12 receives the 22-bit parallel time signal for 4-digit 7-segment indication from the twenty-two output terminals 113a to 113v of the time counting circuit 113 of the time signal circuit 11, at the input terminals 12d to 12r and 12s to 12y of the E.W.S. 12, and receives a pulse signal of a fixed frequency (8 KHz in the illustrated embodiment) extracted from the A.C. power supply 13, at the input terminal 12z of the E.W.S. 12. The pulse signal of the fixed frequency or 8 KHz is frequency-divided to a signal of an appropriate frequency, and a plurality of cycles (e.g. 32 cycles) of the frequency-divided signal define one cycle period. As shown in FIG. 4, the pulse signal of the fixed frequency applied to the terminal 12z is superimposed on the first cycle of the frequency-divided signal (i.e. the first address which is hereinafter referred to as Ch. 1), as a synchronizing reference position signal, and the signals indicative of the contents of the respective bits of the parallel time signal are superimposed on the respective cycles or addresses at and after the second cycle or Ch. 2 of the frequency-divided signal. In this manner, the parallel time signal is converted to the serial time-division multiplex signal by the E.W.S. 12 and produced at the terminal 12a. The serial time-division signal is further explained with reference to FIG. 4. One cycle period of the time-division multiplex signal is divided into 32 channels (addresses) with the Ch. 1 being the reference position signal indicative of the beginning of the cycle period as described above. Sixteen pulse signals, for example, are superimposed on one section of the Ch. 1 to indicate the beginning of the time-division multiplex signal, and twenty-four signals are superimposed on twenty-four channels, i.e. Ch. 2 to Ch. 25 of the remaining thirty channels, i.e. Ch. 2 to Ch. 31. When the time 58 minutes past 11 o'clock is to be displayed by 11:58 and the digit orders thereof are defined as first, second, third and fourth orders from the right to the left, seven channels, i.e. Ch. 2 to Ch. 8 are used to drive the first order seven segments of the display devices of the display units 2 and 2', six channels, i.e. Ch. 9 to Ch. 14 are used to drive the second order six segments (because it is sufficient to display only the digits 0 to 5), seven channels, i.e. Ch. 15 to Ch. 21 are used to drive the third order seven segments, one channel, i.e. Ch. 22 is used to drive the four order blank and the digit 1, one channel, i.e. Ch. 23 is used to drive the colon symbol which is used to separate the o'clock digits from the minute digits and which flashes at 1 Hz, and two channels, i.e., Ch. 24 to Ch. 25 are used for transmitting and receiving the time adjusting signal from the time adjusting unit 3. Thus, total of twenty-four channels are used. Each of the channels of the time-division multiplex signal has a different number of pulse signals to represent the signal level ("H" or "L") of the respective bits of the parallel time signal. For example, the Ch. 3 has four pulses to represent the "H" level and the Ch. 2 has one pulse to represent the "L" level. In the illustrated time-division multiplex signal, the pulses of the Ch. 23 which command the flashing of the colon of the display changes with the shortest period (1 sec.). Therefore, it is preferable to set the one cycle period of the time-division multiplex signal to be much shorter than one second.

FIG. 5 shows an electrical circuit diagram illustrating the detail of the A.C. power supply 13, which comprises an oscillator 131 for generating a pulse signal of the fixed frequency, i.e. 8 KHz, a NOT gate 1301, PNP transistors 1302 and 1303, NPN transistors 1304 and 1305, resistors 1306, 1307, 1308, 1309, 1310 and 1311, capacitors 1312 and 1313, a diode 1314, zener diodes 1315 and 1316 and a transformer 1317. With this arrangement, when the pulse signal from the oscillator 131 is applied to the transistors 1304 and 1305 through the transistors 1302 and 1303, the transistors 1304 and 1305 are alternately turned on and off so that the transformer 1317 produces an A.C. voltage of the fixed frequency, i.e., 8 KHz and a fixed amplitude, i.e., 6 volts across a secondary winding thereof, that is, between terminals 13b and 13c, to which the power lines $l_2$ and $l_3$, respectively, are connected.

FIG. 6 shows an electrical circuit diagram illustrating the detail of the display unit 2. The display unit 2' is identical in construction to the display unit 2. The display circuit 21 includes a fluorescent display tube 211 which is connected to twenty-two firing circuits 2101 to 2122 which each comprise resistors and PNP transistors. The displya circuit 21 receives the signal commanding the display time from the E.W.S. 22 and also receives the A.C. and D.C. voltages from the transform and rectifying circuit 23 to display the time. The E.W.S. 22 receives the time-division signal from the control unit 1 through the input terminal 22a which is connected to the signal line $l_1$ and applies the received signal through a voltage limiting circuit 222 comprising resistors 2221 and 2222 and diodes 2223 and 2224 to LSI's 223 and 224 (RCA TA 6994) which carry out the serial-to-parallel conversion. In order to synchronize the serial-to-parallel conversion operation of the LSI's 223 and 224 with the parallel-to-serial conversion operation of the E.W.S. 12 of the control unit 1, a pulse signal which is in synchronism with the A.C. voltage of 8 KHz and 6 volts from the transform and rectifying circuit 23 is produced by a shaping circuit 221 which comprises resistors 2211, 2212 and 2213, NOT gates 2214 and 2215 and a zener diode 2216, and the produced pulse signal is applied to the LSIs 223 and 224 as a reference time signal. The LSIs 223 and 224 count the contents of the commands superimposed on each of Ch. 2 to Ch. 23 of the serial time-division signal, that is, the number of pulses in each channel, in synchronism with the reference time signal and present a 22-bit parallel static signal, i.e., 21-bit time indicating signal and 1-bit 1 Hz signal to the firing circuits 2101 to 2122. The transform and rectifying circuit 23 comprises a transformer 231, diodes 232 and 233 and capacitors 234 and 235 and receives the A.C. voltage of 6 volts from the A.C. power supply 13 of the control unit 1 through terminals 23a and 23b which are connected to the power lines $l_2$ and $l_3$, respectively. The A.C. voltage is then transformed and rectified to D.C. voltages of +6 volts and −6 volts, which are supplied to the display circuit 21 and the E.W.S. 22. The A.C. voltage of 6 volts is further transformed by the transformer 231 to an A.C. voltage of 1.7 volts relative to the D.C. voltage of −6 volts, which A.C. voltage is supplied to the display device 211.

Figure 7:
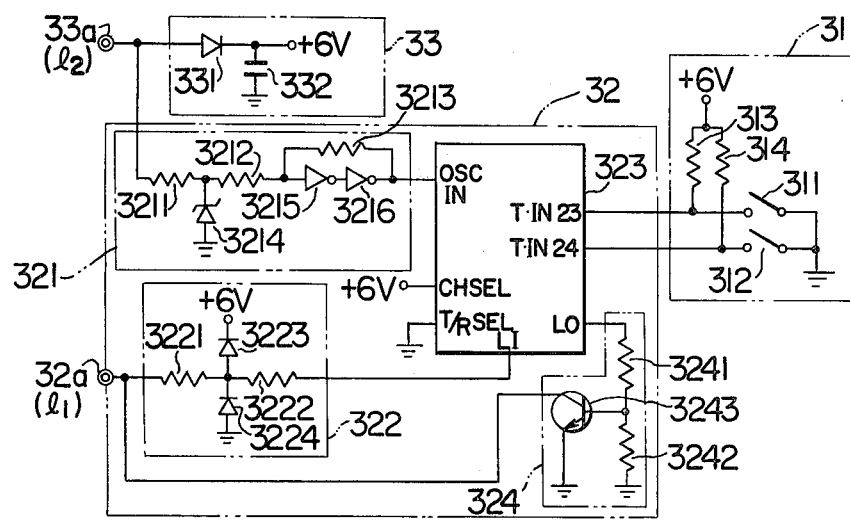

FIG. 7 shows an electrical circuit diagram illustrating the detail of the time adjusting unit 3, in which the time adjusting switching circuit 31 comprises switches 311 and 312 and resistors 313 and 314 and produces an "H" level signal during stationary state (when the switches are closed) and an "L" level signal during the time adjusitng period (when the switches are open) to the E.W.S. 32. The E.W.S. extracts an A.C. signal component from the power supply of A.C. 6 volts supplied from the shaping circuit 321 including resistors 3211, 3212 and 3213, a zener diode 3214 and NOT gates 3215 and 3216, through the power line $l_2$ and the input terminal 33a, and supplies the extracted A.C. signal component to the LSI (RCA TA 6994) which carries out the parallel-to-serial conversion of the reference time signal of 8 KHz for synchronization. The serial time-division signal applied through a voltage limiting circuit 322 comprising resistors 3221 and 3222 and diodes 3223 and 3224 from the input terminal 32a which is connected to the signal line $l_1$, and the parallel output signal from the time adjusting switching circuit 31 are applied to the LSI 323 so that the LSI 323 converts the time adjusting signal to the time-division signal pulses for the Ch. 24 and Ch. 25 in synchronism with the reference time signal and assigns the signal pulses to the two channels in the time-division signal. The time-division signal is presented to the signal line $l_1$ from the terminal 32a through an output circuit 324 comprising resistors 3241 and 3242 and an NPN transistor 3243. Since the numbers of pulses in the Ch. 24 and Ch. 25 of the time-division multiplex signal change when the switching circuit 31 is actuated to retard or advance the display time, the parallel time signal of the time counting circuit 113 is changed by the E.W.S. 12 of the control unit 1. The rectifying circuit 33 comprises a diode 331 and a capacitor 332 and it receives the A.C. voltage of 8 KHz and 6 volts from the input terminal 33a to produce the D.C. voltage of +6 volts which is supplied as the power supply for the time adjusting unit 3.

In the embodiment described above, the parallel time signal produced in the time signal circuit 11 of the control unit 1 is converted by the E.W.S. 12 to the serial time signal, which is then transmitted to two or more display units to display in digital form the time is units of a minute. The adjustment of the time is carried out by the independent time adjusting unit 3 through the E.W.S. Consequently, the adjustment of the time for a plurality of display units 2 and 2' can be carried out in concentrative manner by the single time adjusting unit 3. Thus, when the present system is installed in an automobile such as bus, train, ship, aeroplane or office rooms in a building, the time displayed in each display device is always identical to others and the adjustment of time for all display devices can be carried out at one place.

In the embodiment described above, the A.C. power supply 13 need not be provided in the control unit 1 but instead it may be provided in either the time adjusting unit 3 or the display unit 2 or 2', and one end of the secondary winding of the transformer 1317 of the A.C. power supply 13 and one end of the primary winding of the transformer 231 of the transform and rectifying circuit 23 may be grounded to eliminate the power line $l_3$.

While the 7-segment static output device such as MM 5316 (National Semiconductors Corporation) is used as the LSI for a clock in the illustrated embodiment, an LSI for a clock with binary coded decimal output clock LSI may be used instead, or an LSI for a clock with dynamic output may be used with a latch circuit to convert the output to a static output.

Furthermore, since the power supply for the display unit 2 is variable by the transform and rectifying circuit, light emitting diodes or liquid crystal devices may be used as the display devices.

While the illustrated embodiment is directed to the display of time, the speed may be displayed instead of time in the application of this invention to an automobile or train, or any other information may be displayed in the application to the office rooms of the building.

We claim:

1. A digital display system comprising:
   a single transmission control unit including an A.C. power supply for generating an A.C. voltage of a fixed frequency, and a time-division multiplex signal conversion circuit for extracting a pulse signal of said fixed frequency from said A.C. voltage to produce a reference position signal indicative of the beginning of a one cycle period based on said pulse signal to address a section in said one cycle period and producing a time-division multiplex signal which bears a command pulse at a specified address in accordance with a selected display signal;
   a single signal line over which said time-division multiplex signal is transmitted;
   a pair of power lines over which said A.C. voltage is transmitted; and
   a plurality of display units each operable to read out a pulse signal of said fixed frequency from said A.C. voltage transmitted over said pair of power lines and read out said command pulse from said time-division multiplex signal received through said signal line based on said pulse signal to display in digital form the information relating to said display signal.

2. A digital display system comprising:
   a control unit including oscillation means for producing an oscillation signal at a fixed frequency, power supply means controlled by said oscillation means for supplying an A.C. voltage in a timed relation with said oscilaltion signal, command means for parallelly producing plural bits of parallel digital signals indicative of information to be displayed, and signal conversion means controlled by said oscillation means for converting said parallel digital signals into a serial digital signal in response to said oscillation signal such that each of said parallel digital signals is modulated in a corresponding cycle period of said serial digital signal;
   a single signal transmitting line connected to said signal conversion means for transmitting said serial digital signal therethrough;
   a pair of power transmitting lines connected to said power supply means for transmitting said A.C. voltage therethrough; and
   a plurality of display units connected with said control unit through said signal transmitting line and said power transmitting lines, each of said display units including shaping means for shaping said A.C. voltage transmitted through said power supply lines into a pulse signal which is in timed relation with said A.C. voltage, another signal conversion means controlled by said shaping means for converting said serial digital signal into another parallel digital signals in response to said pulse signal produced by said shaping means such that said serial digital signal is demodulated in each cycle period thereof to a corresponding one of said another parallel digital signal, digital display means for displaying said information indicated by said another parallel digital signal, and A.C. - D.C. conversion means for converting said A.C. voltage transmitted through said power supply lines into a D.C. voltage which is supplid to keep said another signal conversion means and said digital display means operative.

* * * * *